United States Patent [19]
Yamasaki et al.

[11] Patent Number: 5,800,882
[45] Date of Patent: Sep. 1, 1998

[54] MOLDED ARTICLE

[75] Inventors: Chiho Yamasaki, Nishikasugai-gun; Yukihiko Horiba, Konan; Hisaki Tomita, Kasugai; Yasuo Iwata, Nagoya; Kenichi Watanabe, Ama-gun; Tomoko Miyake, Hashima-gun, all of Japan

[73] Assignee: Toyoda Gosei Co., Ltd., Aichi-Ken, Japan

[21] Appl. No.: 694,827

[22] Filed: Aug. 9, 1996

[30] Foreign Application Priority Data

Aug. 10, 1995 [JP] Japan ................... 7-227292

[51] Int. Cl.⁶ .................. B60R 13/04; B32B 5/16
[52] U.S. Cl. ........................... 428/31; 428/327
[58] Field of Search .......................... 428/31, 327

[56] References Cited

U.S. PATENT DOCUMENTS

| | | |
|---|---|---|
| 3,916,046 | 10/1975 | Youngberg ................. 428/31 |
| 4,252,911 | 2/1981 | Simon . |
| 4,254,236 | 3/1981 | Burk . |
| 4,404,323 | 9/1983 | Van Der Loos . |
| 4,419,492 | 12/1983 | Simon . |
| 5,191,023 | 3/1993 | Iwamoto . |

FOREIGN PATENT DOCUMENTS 63-224918  9/1988  Japan .

*Primary Examiner*—Jenna Davis
*Attorney, Agent, or Firm*—Cushman, Darby & Cushman, IP Group of Pillsbury, Madison & Sutro

[57] ABSTRACT

A molded article, useful as an interior part of a motor vehicle, is described. The molded article is formed by injecting a synthetic resin material as a base layer into a mold wherein a synthetic resin film has been placed in close contact with a wall of the mold. The base layer is composed of acrylonitrile butadiene-styrene copolymer or denatured acrylonitrile butadiene-styrene copolymer which is obtained by dispersing butadiene rubber particles within a matrix of acrylonitrile-styrene copolymer or denatured acrylonitrile-styrene copolymer. The acrylonitrile-styrene copolymer or denatured acrylonitrile-styrene copolymer matrix has a molecular weight distribution which is greater than 2.18 and less than 3.05.

19 Claims, 4 Drawing Sheets

( x 10000 )

( x 10000 )

(×10000)

( x 10000 )

MOLDED ARTICLE

BACKGROUND OF THE INVENTION

1. Field of the Invention

The present invention relates to a molded article for use as an interior part of a motor vehicle, such as a console upper panel, or a cover for a radio, for instrument panels or other covered areas.

2. Description of the Related Art

A molded article has been used as an interior part of a motor vehicle, such as a console upper panel. Generally, the molded article is formed by injecting a synthetic resin material into a mold wherein a synthetic resin film has been placed, such that the synthetic resin material as a base layer is joined to the film and an integrated molded article is formed. The film can include a protective layer, a decorative layer formed on the surface of the protective layer in a variety of ways including printing, painting or vacuum metalizing, and an adhesive layer formed on the surface of the decorative layer. The decorative layer can have a wood grain-like appearance. The film thus prepared is joined or bonded to a base layer via the adhesive layer on the surface of the decorative layer.

The above-described molded article has the disadvantage that adhesion between the film and the base layer is not always sufficient. Because of this insufficient adhesion, the molded article can become unattractive over time as the film peels away from the base layer.

SUMMARY OF THE INVENTION

It is an object of the present invention to provide a molded article having improved adhesion between the film and the base layer, and excellent resistance to the film peeling from the base layer. This durability maintains the appearance of the molded article over a long period of time.

The molded article of the present invention includes a film comprised of a synthetic resin material and a base layer comprised of a synthetic resin material formed integrally with the film. The film includes at least a protective layer and an adhesive layer. To form the molded article of the present invention, the synthetic resin material comprising the base layer is pressed into contact with the adhesive layer of the film within a mold while melting the contact face of the base layer. In a preferred embodiment, the film will have been previously placed within the mold and the synthetic resin material, comprising the base layer, is thereafter injected into the mold. The base layer is composed of acrylonitrile-butadiene-styrene copolymer or denatured acrylonitrile-butadiene-styrene copolymer, which is obtained by dispersing butadiene rubber particles within a matrix of acrylonitrile-styrene copolymer or denatured acrylonitrile-styrene copolymer. The acrylonitrile-styrene copolymer or denatured acrylonitrile-styrene copolymer, which is adapted to compose the matrix, has a molecular weight distribution which is greater than 2.18 and less than 3.05. The preferred materials as the matrix include acrylonitrile-styrene copolymer, acrylonitrile-α-methyl-styrene copolymer, acrylonitrile-styrene-α-methyl-styrene copolymer, acrylonitrile-styrene-N-phenylmaleimide copolymer, and a blend of acrylonitrile-styrene copolymer and at least one of acrylonitrile-α-methyl-styrene copolymer, acrylonitrile-styrene-α-methyl-styrene copolymer, acrylonitrile-styrene-N-phenylmaleimide copolymer and polycarbonate.

With the present invention, the adhesion between the base layer and film is greatly improved. The reason for this improvement in adhesion has not been thoroughly investigated. But upon examining a conventional molded article where the film has peeled from a base layer composed of acrylonitrile-butadiene-styrene copolymer, it was shown that destruction occurred within the base layer. This destruction is believed to be caused by the low strength of the acrylonitrile-styrene copolymer matrix. Within the weak acrylonitrile-styrene copolymer matrix, butadiene rubber particles deform due to the pressure used to inject synthetic resin into the mold and orient themselves in a particular direction, which causes destruction of the base layer along interfaces between the oriented butadiene rubber particles and the matrix. In contrast, with the molded article of the present invention, by limiting the molecular weight distribution of the matrix to the above-described specific range, the matrix is strengthened by preventing the deformation and orientation of the butadiene rubber particles, thus achieving excellent adhesion to film.

A large molecular weight distribution means that the molecular weights of the matrix copolymers have a wide scatter, and various molecular weights from a low molecular weight to a high molecular weight are included. When the number of low molecular weight components is relatively large, the fluidity of the matrix of the base layer is enhanced and contact between the base layer and the film is facilitated.

Other objects, features, and characteristics of the present invention will become apparent upon consideration of the following description in the appended claims with reference to the accompanying drawings, all of which form a part of the specification, and wherein like reference numerals designate corresponding parts in the various figures.

DETAILED DESCRIPTION OF THE PRESENTLY PREFERRED EXEMPLARY EMBODIMENTS

Hereinafter, the molded article of the present invention will be explained with reference to the accompanying drawings based on the examples wherein the present invention is applied to a console upper panel of a motor vehicle.

Figure 1:
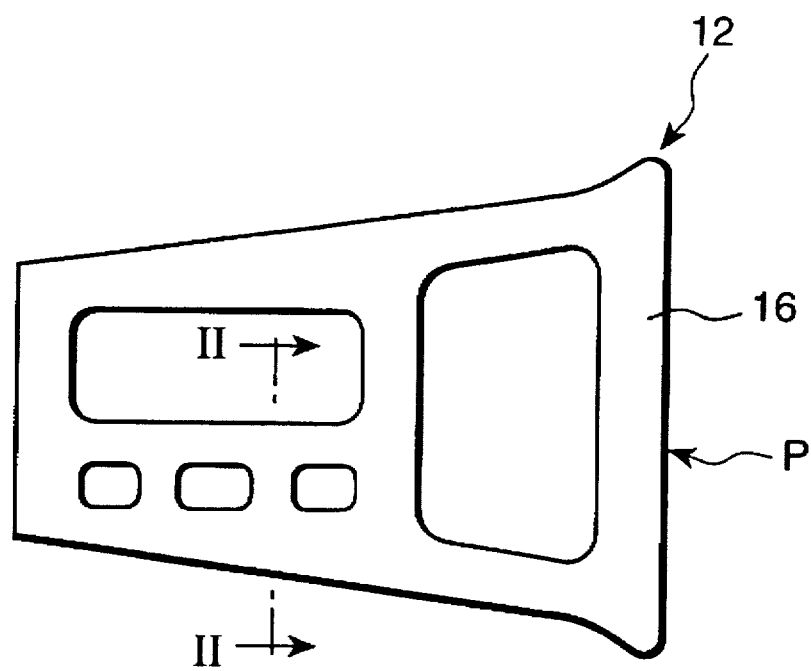
FIG. 1 is a diagrammatic front elevational view of a console upper panel of a motor vehicle, to which the present invention is applied.
Figure 2:
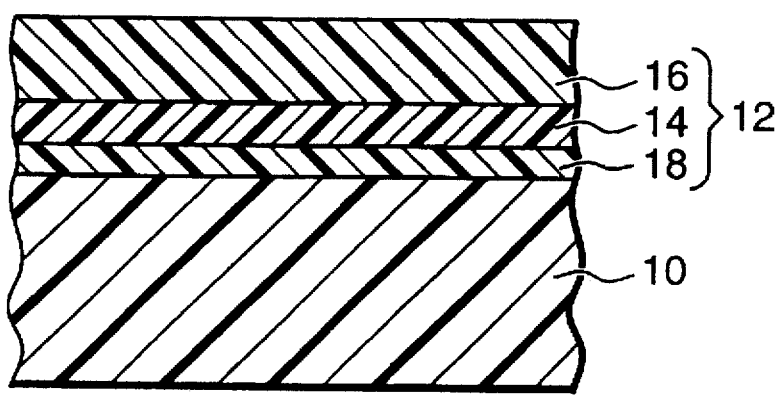
FIG. 2 is a partial cross-sectional view (10,000× magnification) taken along the line II—II of FIG. 1.

FIG. 1 is a front view of a console upper panel P and FIG. 2 is an enlarged, partial cross-sectional view thereof. As shown, the console upper panel P has a base layer 10 which is molded into a predetermined configuration and supports a multi-layer synthetic resin film 12 covering the entire upper surface of base layer 10. In preparing the multi-layer synthetic resin film 12, a decorative layer 14, comprised of polyvinyl chloride or a similar material, is formed and is then covered on one side, for example, the outer side, by a protective layer 16. The decorative layer 14 can be provided with a desired pattern and color, such as, for example, a wood grain-like pattern in a variety of shades and/or other patterns in various colors. The film thus prepared is bonded or joined to the upper surface of the base layer 10 via an adhesive layer 18, comprised of vinyl acetate or a similar material, that has been applied to the inner side of the decorative layer 14.

The base layer 10 is composed of acrylonitrile-butadiene-styrene copolymer or denatured acrylonitrile-butadiene-styrene copolymer (hereinafter called ABS resin). The ABS resin has butadiene rubber particles dispersed within a resin matrix. The resins adapted to compose the matrix include acrylonitrile-styrene copolymer or denatured acrylonitrile-styrene copolymer (hereinafter called AS resin) as a copolymer alone or a blend with another monomer or polymer, which enables improvement of the physical properties of the matrix. Examples of the above described denatured acrylonitrile-styrene copolymer include acrylonitrile-α-methyl-styrene copolymer, acrylonitrile-styrene-α-methyl-styrene copolymer and acrylonitrile-styrene-N-phenylmaleimide-copolymer, which enable improvement of the heat resistance of the matrix. In addition, a blend of acrylonitrile-styrene copolymer and at least one of acrylonitrile-α-methyl-styrene copolymer, acrylonitrile-styrene-α-methyl-styrene copolymer, acrylonitrile-styrene-N-phenylmaleimide copolymer and polycarbonate, which enables improvement of the heat resistance and fluidity of the matrix is also included.

Alternatively, the matrix may be composed of a derivative of an acrylonitrile-styrene copolymer.

With the present invention, the molecular weight distribution d of the AS resin which composes the matrix satisfies the following inequality (1):

$$2.18 < d < 3.05 \qquad (1)$$

The molecular weight distribution d is expressed by the following equation (2):

$$\text{Molecular weight distribution } d = \frac{\text{Weight - average molecular weight } Mw}{\text{Number - average molecular weight } Mn} \qquad (2)$$

A large molecular weight distribution means that the molecular weights of the matrix copolymers are widely distributed, namely, components having various molecular weights from low molecular weight to high molecular weight are included. With the present invention, by limiting the molecular weight distribution to the above-described specific range, the adhesion of the base layer 10 to the film 12 can be greatly improved. When the molecular weight distribution is not greater than 2.18, the content of low molecular weight components is low to prevent melting at the interface between the base layer 10 and film 12, and adhesion at that interface is poor. When the molecular weight distribution is not less than 3.05, the strength of the matrix is decreased.

To produce a console upper panel having the above described arrangement, first, a decorative layer 14 having a pattern, such as a grain-like pattern, is formed and provided with a protective layer 16 by any of several known methods, and the opposite surface of the decorative layer 14 is coated with an adhesive material 18. After drying the adhesive layer 18, the resulting multi-layer film 12 is placed within a mold such that the adhesive layer 18 faces upwards and the film 12 is heated so that film 12 can be brought into close contact with a mold wall, for example, by evacuation. Next, the ABS resin composing the base layer 10 is melted and injected into the mold wherein the film 12 has been placed in close contact with the mold wall, thus integrating the base layer 10 with the film 12. The preferred temperature of the molten ABS resin is 240° C. or more. To prevent orientation of the butadiene rubber particles, it is preferred to make the temperature of the molten ABS resin as high as possible.

The molded article thus formed is taken out of the mold, and extraneous materials are removed from an outer periphery of the molded article and recesses thereof. Thus, a console upper panel as shown in FIG. 1 is obtained.

The molded article of the present invention has been disclosed in Japanese Pat. Appl. No. Hei 7-227292, filed on Aug. 10, 1995, the entire contents of which are hereby incorporated by reference and relied upon.

Embodiments 1 to 4

Console upper panels as shown in FIG. 1 and FIG. 2 were formed by using various ABS resins obtained by dispersing butadiene rubber particles into various matrices composed of acrylonitrile-α-methyl-styrene copolymer (αMSt), acrylonitrile-styrene-N-phenylmaleimide copolymer (maleimide), and a blend of acrylonitrile-styrene copolymer and polycarbonate (PC blend). The composition AN/St, St % and Bd % of each ABS resin and the molecular weight distribution d of each AS resin composing the matrix are listed in TABLE 1. The molecular weight distribution d of each AS resin was measured by a gel permeation chromatography (GPC) device (CCPM type, produced by Toso Co., Ltd.) with a Shodex column (KF80M×2+KF802, produced by Showa Denko, Co., Ltd.) and a photodiode array detector (991J type, produced by Waters), and developed with a tetrahydrofuran solvent. In TABLE 1, for the case of a blend of acrylonitrile-styrene copolymer and polycarbonate (PC blend), the molecular weight distribution and the composition of the AS resin or ABS resin exclusive of polycarbonate are shown.

TABLE 1

|  | d | AN/St | St % | Bd % | denaturation |
|---|---|---|---|---|---|
| Embodiment 1 | 2.485 | 30/70* | 59.0 | 8.0 | α MSt |
| Embodiment 2 | 2.310 | 22/78 | 65.3 | 16.3 | maleimide |
| Embodiment 3 | 2.530 | 23/77 | 71.6 | 7.0 | α MSt |
| Embodiment 4 | 2.820 | 24/76 | 58.0 | 24.0 | PC blend |
| Comparative Ex. 1 | 2.033 | 29/71 | 58.0 | 7.0 | maleimide |
| Comparative Ex. 2 | 1.994 | 30/70 | 54.0 | 8.0 | " |
| Comparative Ex. 3 | 1.817 | 29/71 | — | — | " |
| Comparative Ex. 4 | 2.180 | 28/72 | — | — | " |
| Comparative Ex. 5 | 3.050 | 21/79 | 71.0 | 11.0 | PC blend |

*AN/αMSt

An acrylic film (110 μm film thickness) was used as the protective layer 16 of each console upper panel, and a wood grain-like decorative layer 14 (2 μm film thickness) composed of vinyl chloride was formed on a surface of the protective layer 16. A vinyl acetate adhesive was applied on an upper surface of the decorative layer 14 and dried to obtain an adhesive layer 18. The properties of the acrylic film were as follows:

| | |
|---|---|
| Pencil hardness | 2H |
| Transmissivity | 92.6% |
| Elongation percentage | 500% at 120° C. |
| Light resistance | fade meter (83° C.) 1000 H no abnormality |

Then, the film 12 was placed within a mold such that the adhesive layer 18 faced upwards, heated by a heater for several seconds, and brought into close contact with a mold wall by evacuation. Each ABS resin listed in TABLE 1 was injected into the mold with the film in close contact with the mold wall, thus forming the base layer 10 with the film 12 into a integral molded article. The temperature of each ABS resin was adjusted to 243° C. or 280° C. in Embodiment 1, or 270° C. in Embodiments 2–4. The thus prepared molded articles were taken out of the mold, and an outer periphery of the molded article and recesses thereof was trimmed.

COMPARATIVE EXAMPLES 1 to 5

For comparison, molded articles were prepared using ABS resins having various compositions and molecular weight distributions as shown in TABLE 1, in a process similar to Embodiments 1–4.

The thus prepared molded articles were subjected to a cross-cut test (ASTM D-236), and the adhesion between the base layer 10 and the film 12 was examined. The test results are shown in TABLE 2, wherein +++ means that no peeling occurred in 100 samples, ++ means that peeling occurred in less than 10 out of 100 samples, and + means that peeling occurred in not less than 10 out of 100 samples.

Furthermore, the peeling resistance of film ends and the IZOD impact value were examined. The results thereof are also shown in TABLE 2. The peeling resistance measured for each sample was evaluated with the following three ranks:

| | |
|---|---|
| +++ | no peeling |
| ++ | peeling near film ends |
| + | peeling from film ends to about center of film |

TABLE 2

| | | Embodiment 1 | | Embodiment 2 | Embodiment 3 | Embodiment 4 |
|---|---|---|---|---|---|---|
| Resin temperature °C. | set value | 280 | 243 | 270 | 270 | 270 |
| | measured value | 288 | 274 | — | — | — |
| | difference | +8 | +29 | — | — | — |
| Cross-cut test (adhesion) | | +++ | +++ | +++ | +++ | +++ |
| peeling resistance | | +++ | | +++ | +++ | +++ |
| Izod impact value J/m | | 156.8 | | 147.7 | 155.5 | 462.4 |

| | | Comparative Ex. 1 | | Comparative Ex. 2 | | Comparative Ex. 3 | |
|---|---|---|---|---|---|---|---|
| Resin temperature °C. | set value | 280 | 243 | 280 | 243 | 280 | 243 |
| | measured value | 284 | 253 | 273 | 250 | 283 | 260 |
| | difference | +4 | +10 | −5 | +7 | +3 | +17 |
| Cross-cut test (adhesion) | | +++ | ++ | ++ | + | +++ | + |
| peeling resistance | | ++ | | ++ | | ++ | |
| Izod impact value J/m | | 107.08 | | 108 | | 176.4 | |

TABLE 2-continued

| | | Comparative Ex. 4 | Comparative Ex. 5 |
|---|---|---|---|
| Resin temperature °C. | set value | 280 | 270 |
| | measured value | 272 | — |
| | difference | −8 | — |
| Cross-cut test (adhesion) | | + | +++ |
| peeling resistance | | + | ++ |
| Izod impact value J/m | | 117.7 | 455.9 |

As is apparent from TABLE 2, in the molded articles of Embodiments 1 through 4 of the present invention, no peeling occurred after the cross-cut test. Particularly, in the molded article of Embodiment 1, no peeling occurred even when the difference in the resin temperatures was large. In addition, the peeling resistance of film ends and the IZOD impact value were both good. These test results show that the molded articles of the present invention are excellent in adhesion and impact resistance, as compared to the comparative examples.

Figure 3:
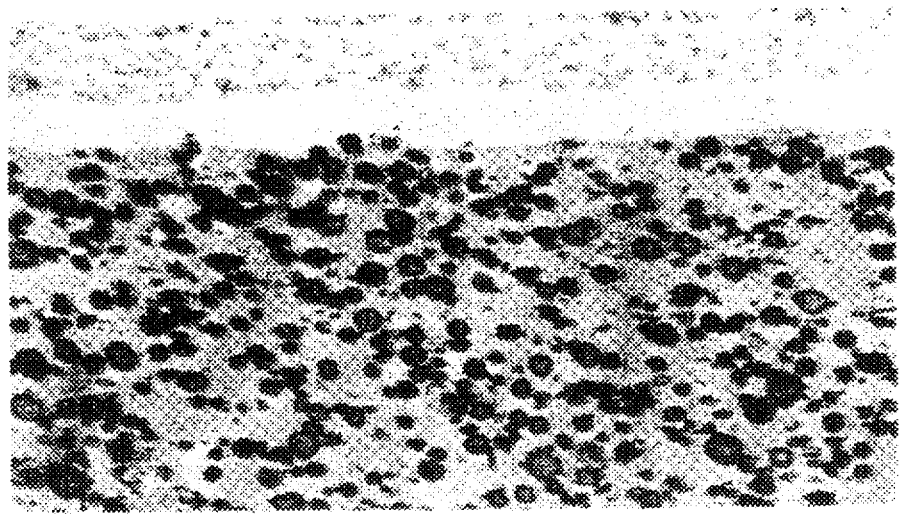
FIG. 3 is a microscope photograph (10,000× magnification) showing a structure of a cross section of Embodiment 1 in accordance with the present invention.
Figure 4:
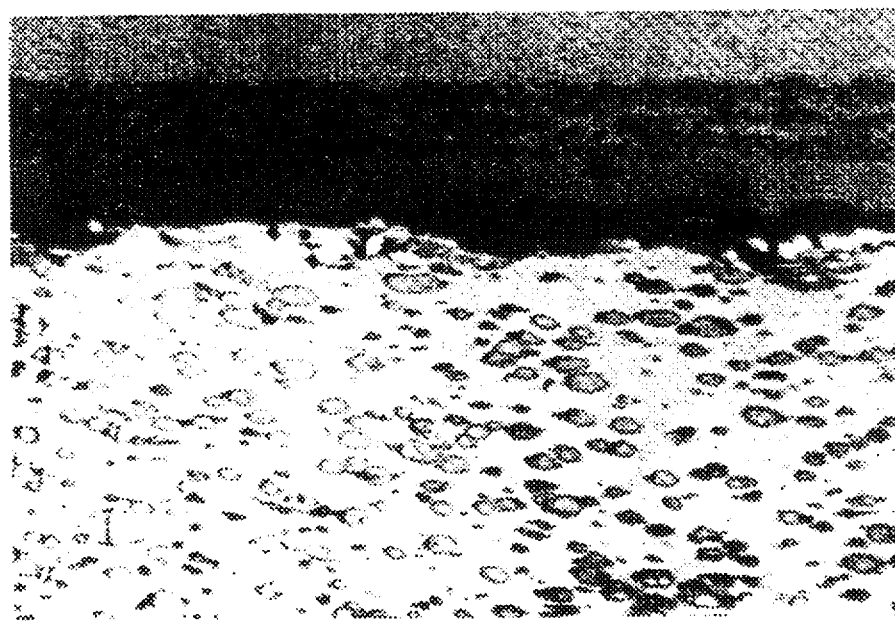
FIG. 4 is a microscope photograph (10,000× magnification) showing a structure of a cross section of Comparative Example 1.

FIGS. 3 and 4 show TEM (transmission electron microscope) photographs (10,000× magnification) of cross sections of molded articles of Embodiment 1 and Comparative Example 1. As shown, the protective layer 16, the decorative layer 14, the adhesive layer 18 and the base layer 10 are arranged in descending order. In the lowermost base layer 10, butadiene rubber particles are dispersed within the matrix of AS resin. As is apparent from these photographs, in the molded article of Embodiment 1 (FIG. 3), the butadiene rubber particles dispersed within the matrix of AS resin are spherical while in the molded article of Comparative Example 1 (FIG. 4), the butadiene rubber particles deform into ellipsoids and are oriented horizontally due to the injection pressure.

Figure 5:
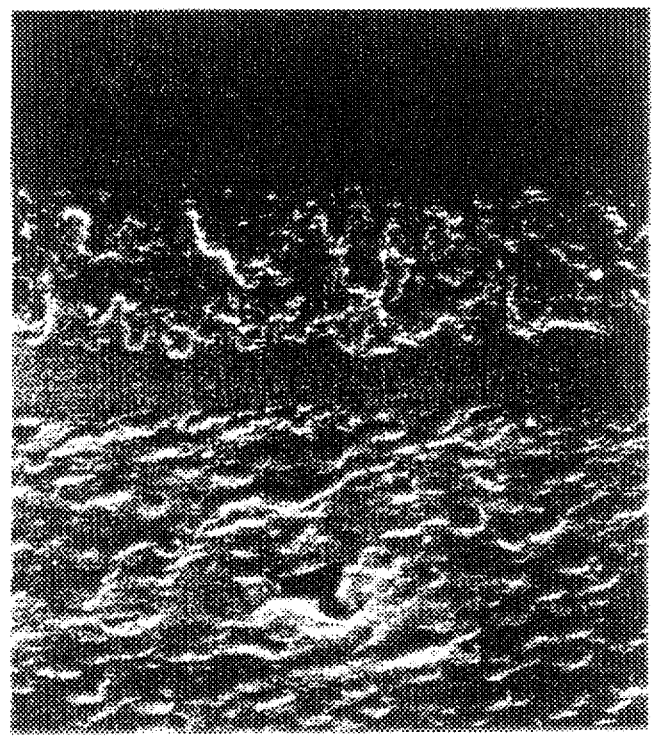
FIG. 5 is a microscope photograph (10,000× magnification) showing a structure of a cross section of a joined part of the Embodiment 1 molded article after a crosscut test.
Figure 6:
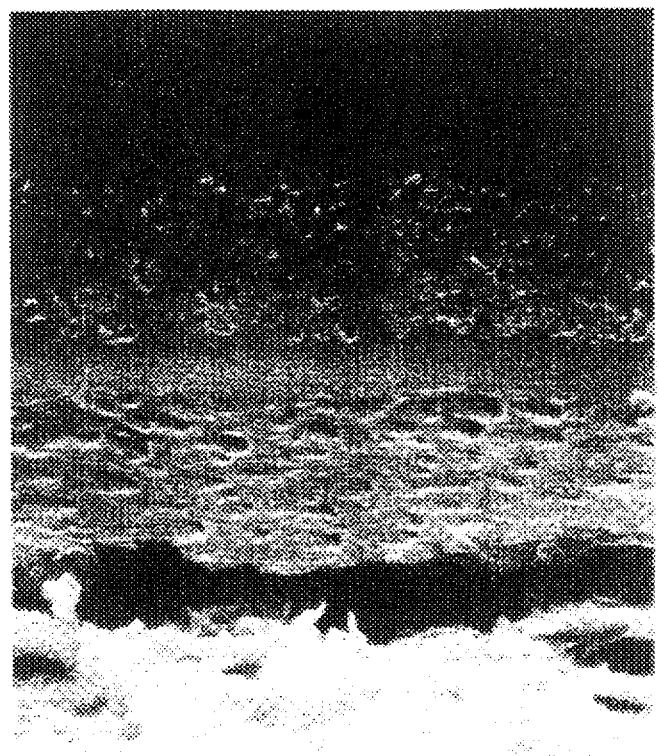
FIG. 6 is a microscope photograph (10,000× magnification) showing a structure of a cross section of a joined part of the Comparative Example 1 molded article after a cross-cut test.

FIGS. 5 and 6 show TEM photographs (10,000× magnification) of joined parts of molded articles of Embodiment 1 and Comparative Example 1, respectively, after the cross-cut test. As is apparent from these photographs, in the molded article of Embodiment 1 (FIG. 5), no peeling occurred while in the molded article of Comparative Example 1 (FIG. 6), destruction occurred within the lowermost base layer 10. This is believed to be caused by the butadiene rubber particles within the matrix of Comparative Example 1 being oriented horizontally, as shown in FIG. 3. This allows destruction of the base layer along interfaces between the butadiene rubber particles and the matrix, thus generating peeling.

As described above, the molded article of the present invention has excellent adhesion between the film and the base layer, and no peeling of the film would occur even after long use of the molded article of the present invention. Therefore, the molded article of the present invention is preferably used as an interior part of a motor vehicle, such as, for example, a console upper panel, and is capable of maintaining good durability and an attractive appearance over a long period of time.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A molded article comprising:

(a) a film comprised of a first synthetic resin material, including at least a protective layer and an adhesive layer, and (b) a base layer comprised of a second synthetic resin material, said adhesive layer being interposed between said protective layer and said base layer, said base layer being integrally formed with said film by joining said second synthetic resin and said adhesive layer of said film in a mold after having melted a contact surface of said base layer prior to contacting said film, said second synthetic resin material comprising butadiene rubber particles dispersed within a matrix, wherein the matrix comprises a copolymer having a molecular weight distribution between 2.18 and 3.05, wherein the copolymer is acrylonitrile-styrene copolymer or denatured acrylonitrile-styrene copolymer.

2. The molded article of claim 1, wherein said adhesive layer comprises vinyl acetate.

3. The molded article as claimed in claim 1, wherein said film further includes a decorative layer between said protective layer and said adhesive layer.

4. The molded article as claimed in claim 1, wherein said adhesive layer in composed of vinyl acetate.

5. The molded article of claim 1, wherein said film further includes a decorative layer provided on a surface of said protective layer and interposed between said protective layer and said adhesive layer.

6. The molded article of claim 5, wherein said decorative layer comprises vinyl chloride.

7. The molded article of claim 1, wherein the denatured acrylonitrile-styrene copolymer is selected from the group consisting of acrylonitrile-α-methyl-styrene copolymer, acrylonitrile-styrene-α-methyl-styrene copolymer, acrylonitrile-styrene-N-phenylmaleimide copolymer, and a blend of acrylonitrile-styrene copolymer and at least one of acrylonitrile-α-methyl-styrene copolymer, acrylonitrile-styrene-α-methyl-styrene copolymer, acrylonitrile-styrene-N-phenylmaleimide copolymer and polycarbonate.

8. The molded article of claim 1, wherein the first synthetic resin material is acrylic resin.

9. An integral molded article comprising laminated layers of:

(a) a protective layer comprised of a synthetic resin material;

(b) a decorative layer, wherein said decorative layer is provided on said protective layer;

(c) an adhesive layer, wherein said decorative layer is held between said adhesive layer and said protective layer; and (d) a base layer comprised of butadiene rubber particles dispersed within a matrix comprising a copolymer having a molecular weight distribution between 2.18 and 3.05, said copolymer comprising acrylonitrile-styrene copolymer or denatured acrylonitrile-styrene copolymer.

10. The molded article of claim 9, wherein the synthetic resin material is acrylic resin.

11. The molded article of claim 9, wherein said decorative layer comprises vinyl chloride.

12. The molded article of claim 9, wherein said adhesive layer comprises vinyl acetate.

13. The molded article of claim 9, wherein the denatured acrylonitrile-styrene copolymer is selected from the group consisting of acrylonitrile-α-methyl-styrene copolymer, acrylonitrile-styrene-α-methyl-styrene copolymer, acrylonitrile-styrene-N-phenylmaleimide copolymer, and a blend of acrylonitrile-styrene copolymer and at least one of acrylonitrile-α-methyl-styrene copolymer, acrylonitrile-styrene-α-methyl-styrene copolymer, acrylonitrile-styrene-N-phenylmaleimide copolymer and polycarbonate.

14. The molded article of claim 1, wherein said butadiene rubber particles dispersed within said matrix are spherical.

15. The molded article of claim 1, wherein said butadiene rubber particles dispersed within said matrix are oriented randomly.

16. The molded article of claim 1, wherein the molded article is a film-integrated molded article.

17. The molded article of claim 9, wherein said butadiene rubber particles are spherical.

18. The molded article of claim 9, wherein said butadiene rubber particles dispersed within said matrix are oriented randomly.

19. The molded article of claim 9, wherein the integral molded article is a film-integrated molded article.

* * * * *